United States Patent [19]

Kushitani et al.

[11] Patent Number: 5,244,847
[45] Date of Patent: Sep. 14, 1993

[54] ALKALI FREE GLASS

[75] Inventors: Hideki Kushitani; Manabu Nishizawa; Yasumasa Nakao, all of Yokohama, Japan

[73] Assignee: Asahi Glass Company Ltd., Tokyo, Japan

[21] Appl. No.: 873,207

[22] Filed: Apr. 24, 1992

[30] Foreign Application Priority Data

Apr. 26, 1991 [JP] Japan .................. 3-124948

[51] Int. Cl.$^5$ .................. C03C 3/091; C03C 3/087
[52] U.S. Cl. .................. 501/66; 501/67; 501/70
[58] Field of Search .................. 501/66, 70, 69, 66, 501/67

[56] References Cited

U.S. PATENT DOCUMENTS

| | | | |
|---|---|---|---|
| 3,847,627 | 11/1974 | Erickson et al. | 501/70 X |
| 3,978,362 | 8/1976 | Dumbaugh, Jr. et al. | |
| 4,180,618 | 12/1979 | Alpha et al. | |
| 4,255,198 | 3/1981 | Danielson et al. | |
| 5,116,788 | 5/1992 | Dumbaugh, Jr. | 501/66 |
| 5,116,789 | 5/1992 | Dumbaugh, Jr. et al. | 501/66 |

OTHER PUBLICATIONS

Chemical Abstracts, 66619b, vol. 95, No. 8, Aug. 1981, & JP-A-56 032 347, Apr. 1, 1981, p. 288, "Glass for Tungstenhalogen Electric Lamps".

*Primary Examiner*—Karl Group
*Attorney, Agent, or Firm*—Oblon, Spivak, McClelland, Maier & Neustadt

[57] ABSTRACT

An alkali free glass having a strain point of at least 650° C. and consisting essentially of from 55 to 65 wt % of $SiO_2$, from 10 to 18 wt % of $Al_2O_3$, from 0 to 3 wt % of $B_2O_3$, from 0 to 3 wt % of MgO, from 8 to 15 wt % of CaO, from 8 to 15 wt % of SrO and from 0 to 3 wt % of ZnO and essentially free from alkali metal oxides and BaO.

1 Claim, No Drawings

ALKALI FREE GLASS

The present invention relates to an alkali free glass which is substantially free from alkali metal oxides and capable of being formed by a float method and which is thus useful as glass substrates for various displays or photo masks.

Heretofore, glass substrates for various displays, particularly those having a thin metal film formed on their surface, are required to have high levels of the following properties.

(1) Since they are exposed to high temperature during the step for the formation of the thin film, they are required to have a high strain point.

(2) If they contain an alkali metal oxide, the alkali metal ions are likely to diffuse into the thin film, whereby the film properties are likely to deteriorate. Therefore, they are required to be substantially free from alkali metal ions.

(3) They are required to be free from internal and surfacial defects (bubbles, striae, inclusions, pits, scratch marks, etc.).

(4) They are required to have excellent chemical durability so as to be durable during the washing step.

In recent years, liquid crystal displays having a thin film transistors (TFT) using amorphous silicon (a-Si) or polycrystalline silicon (p-Si) formed on a glass substrate, are increasing. A display substrate using the latter polycrystalline silicone, is required to have a strain point of at least 650° C.

Further, these display substrates are frequently exposed to buffered hydrofluoric acid which is prepared by adding ammonium fluoride as a buffering agent to hydrofluoric acid, for etching e.g. $SiO_2$ or $Si_3N_4$ in a process for producing semiconductors.

Conventional alkali free glass has a low strain point or when exposed to buffered hydrofluoric acid, it becomes useless in many cases, since a reaction product formed on the surface can not easily be removed.

Glass having a strain point of at least 650° C. is disclosed in Japanese Unexamined Patent Publications No. 32038/1983, No. 132536/1986 and No. 281041/1986. However, the glass composition of Japanese Unexamined Patent Publication No. 32038/1983 contains lead oxide, whereby it is necessary to provide a removal apparatus for the mixing installation, the melting installation and the polishing installation, and such environment is not preferable as a working environment. The glass composition of Japanese Unexamined Patent Publications No. 132536/1986 and No. 281041/1986 contain excess MgO and BaO, whereby the buffered hydrofluoric acid resistance is not adequate.

Japanese Unexamined Patent Publication No. 132536/1986 discloses a glass substantially free from MgO. This glass is excellent in the buffered hydrofluoric acid resistance, but the strain point is not sufficiently high, since it contains from 3 to 12 wt % of $B_2O_3$.

It is an object of the present invention to solve the above problems and to provide an alkali free glass which has a strain point of at least 650° C. and is excellent in the buffered hydrofluoric acid resistance and which can easily be melted and formed and is capable of being formed by a float method and has a low thermal expansion coefficient.

The present invention provides an alkali free glass having a strain point of at least 650° C. and consisting essentially of from 55 to 65 wt % of $SiO_2$, from 10 to 18 wt % of $Al_2O_3$, from 0 to 3 wt % of $B_cO_3$, from 0 to 3 wt % of MgO, from 8 to 15 wt % of CaO, from 8 to 15 wt % of SrO and from 0 to 3 wt % of ZnO and essentially free from alkali metal oxides and BaO.

Now, the present invention will be described in detail with reference to the preferred embodiments.

In this specification, the viscosity $\eta$ of glass is represented by the unit of poise, and the strain point is the temperature where $\log \eta = 14.5$.

Now, the reasons for limiting the compositional ranges of the respective components will be described.

If $SiO_2$ is less than 55 wt %, the chemical durability of the glass tends to be poor, and the thermal expansion coefficient tends to be large, such being undesirable. On the other hand, if it exceeds 65 wt %, the melting property tends to deteriorate, and the liquidus temperature tends to increase, such being undesirable. $SiO_2$ is preferably within a range of from 58 to 61 wt %. $Al_2O_3$ has a function to suppress the phase separation of the glass, to reduce the thermal expansion coefficient and to increase the strain point. If it is less than 10 wt %, this effect can not be obtained, and if it exceeds 18 wt %, the melting property of the glass tends to be poor, and the buffered hydrofluoric acid resistance tends to be poor. $Al_2O_3$ is preferably within a range of from 11.5 to 15 wt %.

$B_2O_3$ is a component effective for preventing formation of turbidity by buffered hydrofluoric acid and for providing a low expansion coefficient and good melting property. However, if it exceeds 3 wt %, the strain point tends to be low, such being undesirable. $B_2O_3$ is preferably within a range of from 1 to 2.5 wt %.

MgO is effective for lowering the thermal expansion coefficient of the glass. However, if it exceeds 3 wt %, turbidity by buffered hydrofluoric acid or phase separation of the glass is likely to occur, such being undesirable. MgO is preferably not substantially present.

CaO is effective for improving the melting property and controlling the liquidus temperature. However, if it is less than 8 wt %, such an effect tends to be inadequate, and if it exceeds 15 wt %, the thermal expansion coefficient tends to be too large, and crystals of CaO.$Al_2O_3$.$SiO_2$ tend to precipitate, such being undesirable. CaO is preferably within a range of from 10 to 14 wt %.

SrO provides substantially the same effect as CaO, when incorporated. If SrO is less than 8 wt %, such an effect is little, and if it exceeds 15 wt %, the thermal expansion coefficient tends to be too large. SrO is preferably within a range of from 11 to 15 wt %.

ZnO is effective to lower the thermal expansion coefficient of the glass. However, if it exceeds 3 wt %, turbidity by buffered hydrofluoric acid is likely to form, and it is likely to be reduced and evaporated to form a different quality layer on the surface in the float bath during its preparation, whereby forming by a float method tends to be difficult. ZnO is preferably within a range of from 0 to 2 wt %.

BaO is not substantially contained, since it tends to deteriorate the buffered hydrofluoric acid resistance.

The glass of the present invention may contain not more then 5 wt % in total of $ZrO_2$, $P_2O_5$, $TiO_2$, $SO_3$, $As_2O_3$, $Sb_2O_3$, F and Cl in order to improve the melting property, refining property and formability of the glass in addition to the above-mentioned components.

The glass of the present invention can be produced, for example, by the following process.

Starting materials of the respective components commonly used, are mixed in the desired proportions, and the mixture is continuously introduced into a melting furnace and melted under heating at a temperature of from 1,500° to 1,600° C. This molten glass is formed into a sheet having a predetermined thickness by a float method, followed by gradual cooling and cutting.

Now, the present invention will be described in further detail with reference to Examples. However, it should be understood that the present invention is by no means restricted to such specific Examples.

EXAMPLES

Starting materials of the respective components were mixed to have the desired proportions as identified in Table 1 (unit: wt %), and the mixture was heated and melted in a platinum crucible at a temperature of from 1,500 to 1,600° C. The molten glass was stirred with a platinum stirrer for 2 hours for homogenizing the glass during the melting. Then, the molten glass was casted into a sheet form, followed by annealing.

The results of the measurements of the physical properties of the glass samples thereby obtained are shown in Table 2. In the Tables, samples 1 to 6 represent Examples of the present invention, and samples 7 to 9 represent Comparative Examples.

The buffered hydrofluoric acid resistance was determined in such a manner that a sheet glass polished to have a mirror surface was immersed in a liquid mixture of an aqueous ammonium fluoride solution and an aqueous hydrofluoric acid solution (a solution obtained by mixing a 40 wt % ammonium fluoride aqueous solution and a 51 wt % hydrofluoric acid aqueous solution in a weight ratio of 30:1) at 25° C. for 20 minutes, whereupon the haze value was measured by a haze meter (manufactured by Suga Shikenki K.K.).

As is evident from Table 2, the glass in each of the Examples has a low thermal expansion coefficient at a level of from 45 to $60 \times 10^{-7}/°C$. and a relatively low temperature for log $\eta = 2.5$ which is an index for the melting property, thus indicating that it can easily be melted. Further, the relation as an index for formability between the temperature for log $\eta = 4.0$ and the liquidus temperature is good, thus indicating that there will be no trouble of devitrification during the forming operation.

The strain point is as high as at least 650° C., thus indicating that it is adequately durable against heat treatment at a high temperature.

The buffered hydrofluoric acid resistance is also excellent, and the glass is free from formation of turbidity.

On the other hand, samples 8 and 9 representing Comparative Examples have high strain points, and they are inferior in the buffered hydrofluoric acid resistance, although the temperature for log $\eta = 2.5$ as an index of the melting temperature, is relatively low and the melting property is considered to be good. Further, sample 10 as a Comparative Example has a low strain point and is considered to be not durable against heat treatment at a high temperature, although the buffered hydrofluoric acid resistance is good.

TABLE 1

| Sample No. | 1 | 2 | 3 | 4 | 5 | 6 | 7 | 8 | 9 | 10 |
|---|---|---|---|---|---|---|---|---|---|---|
| $SiO_2$ | 60 | 60 | 61 | 60 | 61 | 58 | 57 | 55 | 60 | 60 |
| $Al_2O_3$ | 12 | 15 | 12 | 12 | 12 | 11 | 15 | 15 | 17 | 12 |
| $B_2O_3$ | 2 | 2 | 2 | 1 | 2 | 3 | — | 2 | 4 | 5 |
| MgO | — | — | 3 | — | — | 2 | 2 | 6 | 8 | — |
| CaO | 12 | 11 | 8 | 13 | 12 | 12 | 14 | 6 | 11 | 7 |
| SrO | 14 | 12 | 14 | 14 | 10 | 14 | 9 | — | — | 1 |
| BaO | — | — | — | — | — | — | — | 6 | — | 15 |
| ZnO | — | — | — | — | 3 | — | 3 | 10 | — | — |

TABLE 2

| Sample No. | 1 | 2 | 3 | 4 | 5 | 6 | 7 | 8 | 9 | 10 |
|---|---|---|---|---|---|---|---|---|---|---|
| Thermal expansion coefficient ($\times 10^{-7}/°C$.) | 56 | 52 | 49 | 56 | 52 | 41 | 59 | 44 | 44 | 47 |
| Temp. where log $\eta = 2.5$ (°C.) | 1,447 | 1,503 | 1,463 | 1,440 | 1,450 | 1,498 | 1,430 | 1,386 | 1,419 | 1,476 |
| Temp. where log $\eta = 4.0$ (°C.) | 1,201 | 1,237 | 1,218 | 1,197 | 1,210 | 1,213 | 1,170 | 1,163 | 1,190 | 1,204 |
| Liquidus temp. (°C.) | 1,200 | 1,215 | 1,238 | 1,194 | 1,228 | 1,188 | 1,165 | 1,168 | 1,185 | 1,150 |
| Strain point (°C.) | 680 | 685 | 670 | 690 | 670 | 650 | 670 | 665 | 675 | 635 |
| Buffered hydrofluoric acid resistance (%) | 6 | 7 | 7 | 7 | 4 | 2 | 10 | 35 | 28 | 3 |

The glass of the present invention is capable of being formed by a float method. Further, it is free from formation of turbidity by buffered hydrofluoric acid and has high heat resistance and a low thermal expansion coefficient. Thus, it is suitable for use in the applications where such properties are required, for example, as display substrates, photo mask substrates or TFT type display substrates.

We claim:

1. An alkali free glass having a strain point of at least 675° C. which consists essentially of:
   from 58 to 61 wt. % of $SiO_2$, from 11.5 to 15 wt. % of $Al_2O_3$, from 1 to 2.5 wt. % of $B_2O_3$, from 10 to 14 wt. % of CaO, from 11 to 15 wt. % of SrO and from 0 to 2 wt. % of ZnO and which is essentially free of MgO.

* * * * *